Patented Apr. 9, 1935

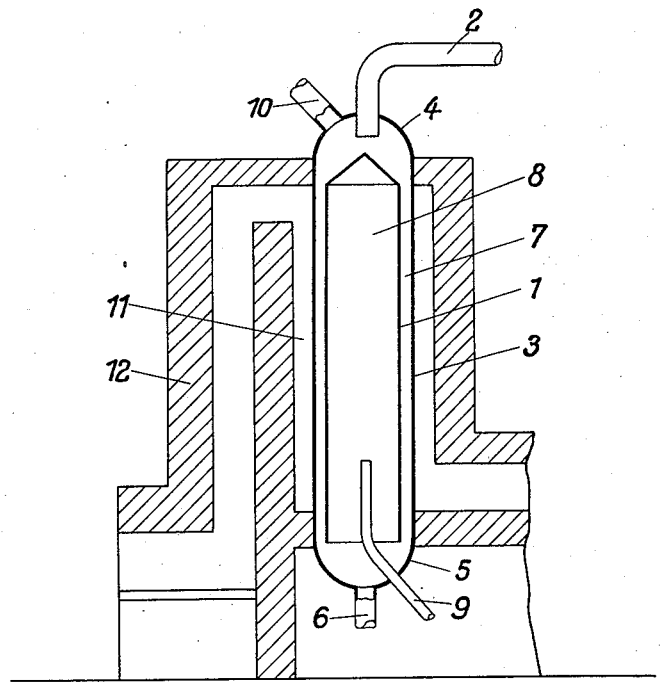

1,996,852

UNITED STATES PATENT OFFICE 1,996,852

PROCESS AND APPARATUS FOR DISTILLING OR EXPELLING VOLATILE CONSTITUENTS FROM LIQUIDS

Clemens Bergell, Berlin-Steglitz, Germany

Application January 19, 1934, Serial No. 707,365
In Germany February 6, 1932

4 Claims. (Cl. 159—13)

This invention has for its object a perfecting of the already known proposals for distilling or expelling volatile constituents from liquids. It has already been proposed to permit the liquids in question to run over a hot surface in the form of a very thin layer, the said surface being heated from the rear. In this way it is obvious that superheating at isolated spots and consequent impairing of the volatile constituents are very readily possible.

In order to remedy these drawbacks the applicant arranges the heating surface at a sufficient distance with respect to the liquid layer, so that the heating is effected by radiation and superheating is out of the question. Nevertheless a further mild heating, e. g. by strongly superheated steam, may be effected at the rear of the guiding surface, which heating can then be readily maintained within temperature limits such that the said disadvantageous consequences are obviated.

In the accompanying drawing is shown schematically and by way of example a sectional elevation of a constructional form of a plant suitable for carrying out this process. All equipment, valves, and so forth have been omitted since they are obvious components.

In the figure, 1 is a comparatively high and narrow heating body of for example 50 cm. diameter and about 3 to 4 metres high, consisting of sheet metal with a cylindrical cross-section; the liquid to be treated runs over this body, being supplied from the supply pipe 2, the outer surface of the body having the property of acting as a guiding surface for the liquid.

By means of expedients which are known and therefore are not here described in detail or shown in the drawing the liquid stream can be readily uniformly distributed over the whole outer surface of the body 1. As a rule the heating body 1 is open at the bottom. It is concentrically surrounded at a small distance, e. g. of 1 cm., by a second heating body 3 which terminates at the top in a dome 4 and at the bottom in a receptacle portion 5. The portion of the liquid which is not evaporated runs out of the latter through a pipe 6. A ring-like evaporating chamber 7 is thus situated between the cylinders 1 and 3.

In order to withdraw the vapours produced by the heat supplied as rapidly as possible from the range of the liquid, a neutral gas or vapour, best of all steam, is conducted through the space 1 and 3 with a considerable velocity, about 5 to 15 metres per second at atmospheric pressure. This velocity is greater, however, if the process is carried out in a vacuum. In this case it must be increased to an extent such that it corresponds to the carrying-off power of the streaming vapours or gases, which decreases as the vacuum increases. The introduction of the steam or vapour is, in the constructional form shown, effected for example such that a pipe 9, through which the steam or vapour can enter, is introduced below into the space 8 surrounded by the guiding surface 1 and open at the bottom. The steam or vapour rises in the space 8 and after yielding up a certain amount of heat and after descending again, enters into the space 7 between 1 and 3 all round the lower periphery of 1. This space 7 and the space 11 corresponding thereto but which has still to be mentioned are, for the sake of clearness, shown disproportionately wide. These vapours or gases escape at the top at 10 together with the vapours developed from the liquid.

The whole plant is surrounded at the exterior in the constructional form shown by furnace flues 11, which are arranged in a furnace 12. It is obvious that any other way of heating can be chosen. The liquid being treated may, if desired, be preliminarily heated in any desired manner, and further several vaporizers may be connected one behind the other in series so that the liquid treated in one vaporizer is re-treated in the next, and so on.

According to the invention here described it is possible to distil off uninterruptedly volatile constituents from liquids with the aid of apparatus which is not extensive. The distillation material remains in contact with the gases evolved therefrom for only a very short time. This is effected more particularly owing to the fact that the gases or vapours between the bodies 1 and 3 stream at atmospheric pressure with a velocity of 5 to 15 metres per second. On the other hand this velocity must not be so great that non-vaporized liquid is carried away. The conditions for maintaining the correct velocity constitute the chief problem in the erection and operation of the plant here described. On the one hand these follow from the size of the cross-section in the space 7 between 1 and 3 and on the other hand from the quantity of the gas or vapour streaming in at 9.

In order to promote the current a vacuum may also be applied at 10, in which case the velocity, for a pressure of about 38 mm. of mercury, may rise to 100–300 metres per second, since the carrying-off power of the vapours decreases in proportion to their dilution.

The present process can be used for the treatment of various raw materials, such as for example fatty acids, tar oils, mineral oils or the like. More particularly it may also be used without the obtention of a distillate for vaporizing edible oils, (e. g. olive oil), or for removing fatty acids from neutral oils. Operations are carried out with or without the aid of indifferent gases, according to the nature of the substances to be treated; upon the nature of these substances, too, depends whether a vacuum is used or not, or whether these two expedients are used in any desired combination.

As compared with other processes having similar objects, the present process affords a considerable saving in plant and operation costs, since it requires only an apparatus which more particularly is very simple, cheap and readily supervised.

*Examples*

1. Bone fat fatty acid, preliminarily heated to 270° C., was treated for 24 hours in an apparatus of the kind shown in the figure in which the body 1 had a height of 3 metres and a diameter of 50 cm., the ring-shaped space 7 being 1 cm. wide. The following results were obtained: 6000 kg. of material were passed through the said apparatus. The vapours coming off had a temperature of 280° C. The steam or vapour supplied at 9 had a temperature of 300–500° C. No vacuum was employed. About 10% of material was yielded at 6 and by repeated distillation could be distilled down to pitch.

2. In a similar apparatus 6000 kg. of edible ground-nut oil were treated after preliminary heating to 200° C. for evaporation purposes. Only vapours escaped which were laden with odoriferous substances. A thoroughly steamed or purified oil was drawn off from the bottom.

3. In a similar apparatus 10000 kg. of a benzine fat solution containing about 20° fat originating from the extraction of fat were passed through after preheating to 70° C. without any steam or vapour being supplied. The pure benzine escaped at the top whilst the pure fat flowed out at the bottom. The distillation temperature of the benzine is so low that it is not necessary to conduct a medium which promotes the distillation through the plant.

What I claim is:—

1. A plant for distilling or expelling volatile constituents from liquids comprising a hollow member adapted to act as a guiding surface for the liquid and an exteriorly heatable element closed at each end and surrounding said hollow member and forming a narrow space around said hollow member, means at one end of said heatable element for supplying liquid to the surface of said hollow element, a pipe at the other end of the heatable element communicating with the interior of the hollow member for supplying heated indifferent fluid thereto, thereby furnishing heat to the thin layer of liquid traversing the guiding surface in addition to that radiated thereto from the heatable element, a suitable communication between one end of said space and the interior of said hollow member, and means at the ends of the heatable element for withdrawing the products of the heat treatment, thereby leading away at one end thereof the volatilized portion of the liquid together with the indifferent fluid supplied and leading away at the other end the non-volatilized portion of said liquid and fluid.

2. A method of distilling, or expelling volatile constituents from liquids, consisting in distributing the liquid in the form of an upright thin tubular film, guiding said film in a downward direction past a tubular source of radiant heat surrounding the outer surface of said film at a small distance therefrom, supplying a heated gaseous substance to the interior surface of said tubular film, and thereupon passing said gaseous substance in upward direction between the film and the surrounding source of radiant heat at a velocity of 5–15 metres/sec. for atmospheric pressure.

3. A method of distilling or expelling volatile constituents from liquids, consisting in distributing the liquid in the form of an upright thin tubular film, guiding said film in a downward direction past a tubular source of radiant heat surrounding the outer surface of said film at a small distance therefrom, supplying a heated gaseous substance to the interior surface of said tubular film, and thereupon passing said gaseous substance in upward direction through the space between said liquid film and the surrounding source of radiant heat under a pressure less than prevailing atmospheric pressure, the rate of flow of the gaseous substance being greater the greater the degree of vacuum.

4. A method of distilling or expelling volatile constituents from liquids, consisting in distributing the liquid in the form of a thin, upright tubular film, guiding said film in a downward direction past a tubular source of radiant heat surrounding the outer surface of said film at a small distance therefrom, supplying a heated gaseous substance to the interior surface of said tubular film and thereupon passing said gaseous substance in upward direction between the film and the surrounding source of radiant heat.

CLEMENS BERGELL.